United States Patent
Goodwin, III

(10) Patent No.: US 6,173,268 B1
(45) Date of Patent: Jan. 9, 2001

(54) METHOD OF DISPLAYING TEMPORARY INFORMATION BY AN ELECTRONIC PRICE LABEL

(75) Inventor: John C. Goodwin, III, Suwanee, GA (US)

(73) Assignee: NCR Corporation, Dayton, OH (US)

( * ) Notice: Under 35 U.S.C. 154(b), the term of this patent shall be extended for 0 days.

(21) Appl. No.: 09/205,739

(22) Filed: Dec. 4, 1998

(51) Int. Cl.$^7$ .................................................. G06F 17/60
(52) U.S. Cl. ................. 705/20; 705/14; 705/16; 705/23
(58) Field of Search ................... 705/14, 16, 20, 705/23, 26; 235/383, 462.15, 472.01; 340/825.35, 825.52, 825.55

(56) References Cited

U.S. PATENT DOCUMENTS

| | | | |
|---|---|---|---|
| 5,339,392 | * 8/1994 | Risberg et al. | 395/161 |
| 5,539,393 | 7/1996 | Barfod | 340/825.52 |
| 5,704,049 | 12/1997 | Briechle | 395/326 |

FOREIGN PATENT DOCUMENTS

| | | |
|---|---|---|
| 0604382 | 6/1994 | (EP) . |
| 0828235 | * 11/1998 | (EP) . |
| 8602477 | 4/1986 | (WO) . |

OTHER PUBLICATIONS

Bell Labs Technology, Trends & Developments, p. 1, Jan. 1996.*
Purchasing Manyindustries, pp. 1–3, Dec. 1997.*
Will supermarkets play electronic tag?, Garry Michael, pp. 1–4, Jul. 1991.*
Hardee's taps el pollo's perry as chief officer, pp. 1–2, Sep. 1995.*
Improving pricing accuracy at the supermarket: Electronic shelving systems, goodstein Ronad, pp. 1–7, Jan. 1996.*

* cited by examiner

Primary Examiner—James P. Trammell
Assistant Examiner—Mussie Tesfamariam
(74) Attorney, Agent, or Firm—Paul W. Martin

(57) ABSTRACT

A method of displaying temporary information by an electronic price label (EPL) which saves bandwidth and time. The method includes the steps of receiving a message containing second information by the EPL, ceasing display of first information by the EPL, displaying the second information by the EPL, reading the first information from a memory within the EPL by the EPL, and redisplaying the first information by the EPL.

12 Claims, 5 Drawing Sheets

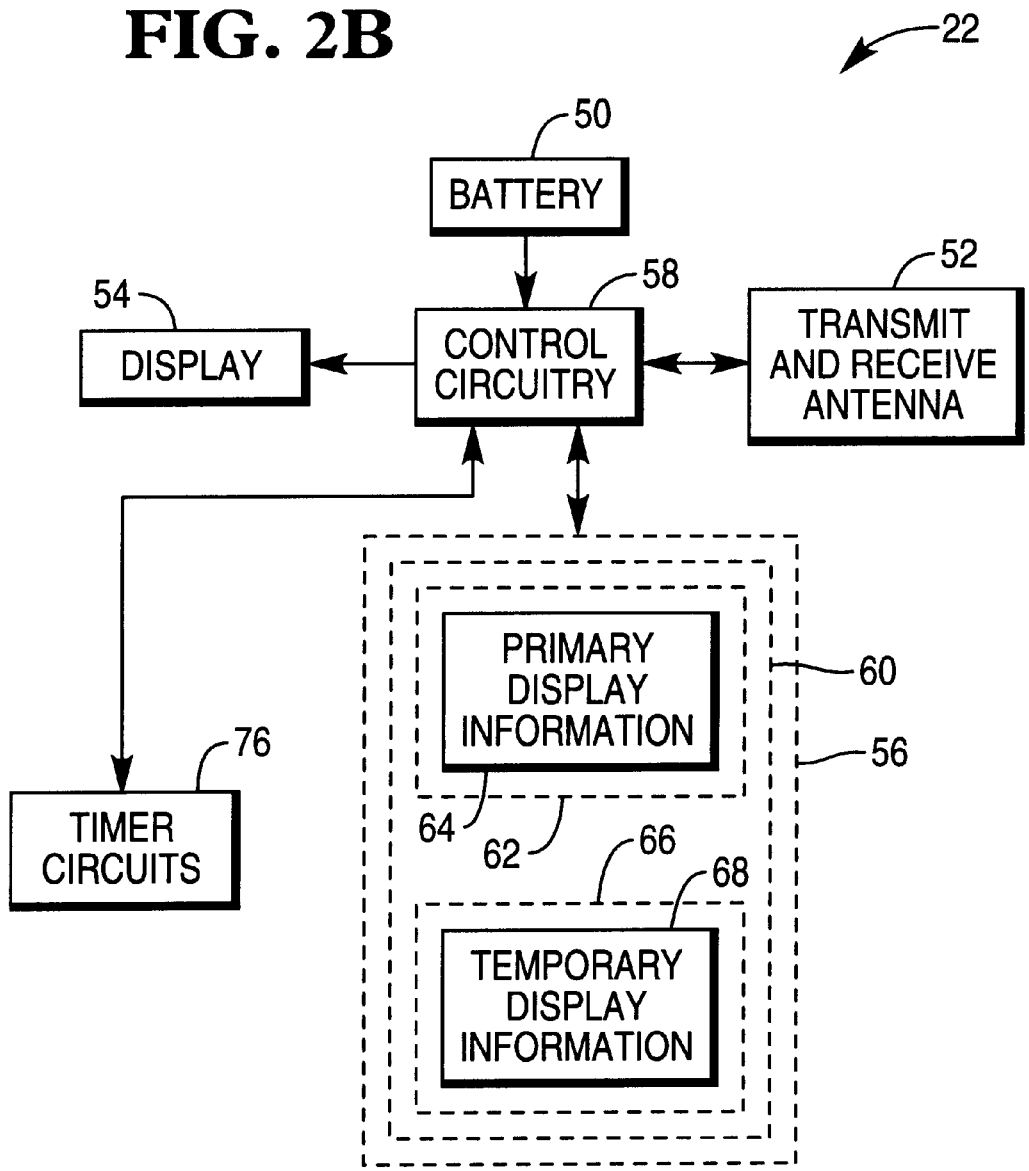

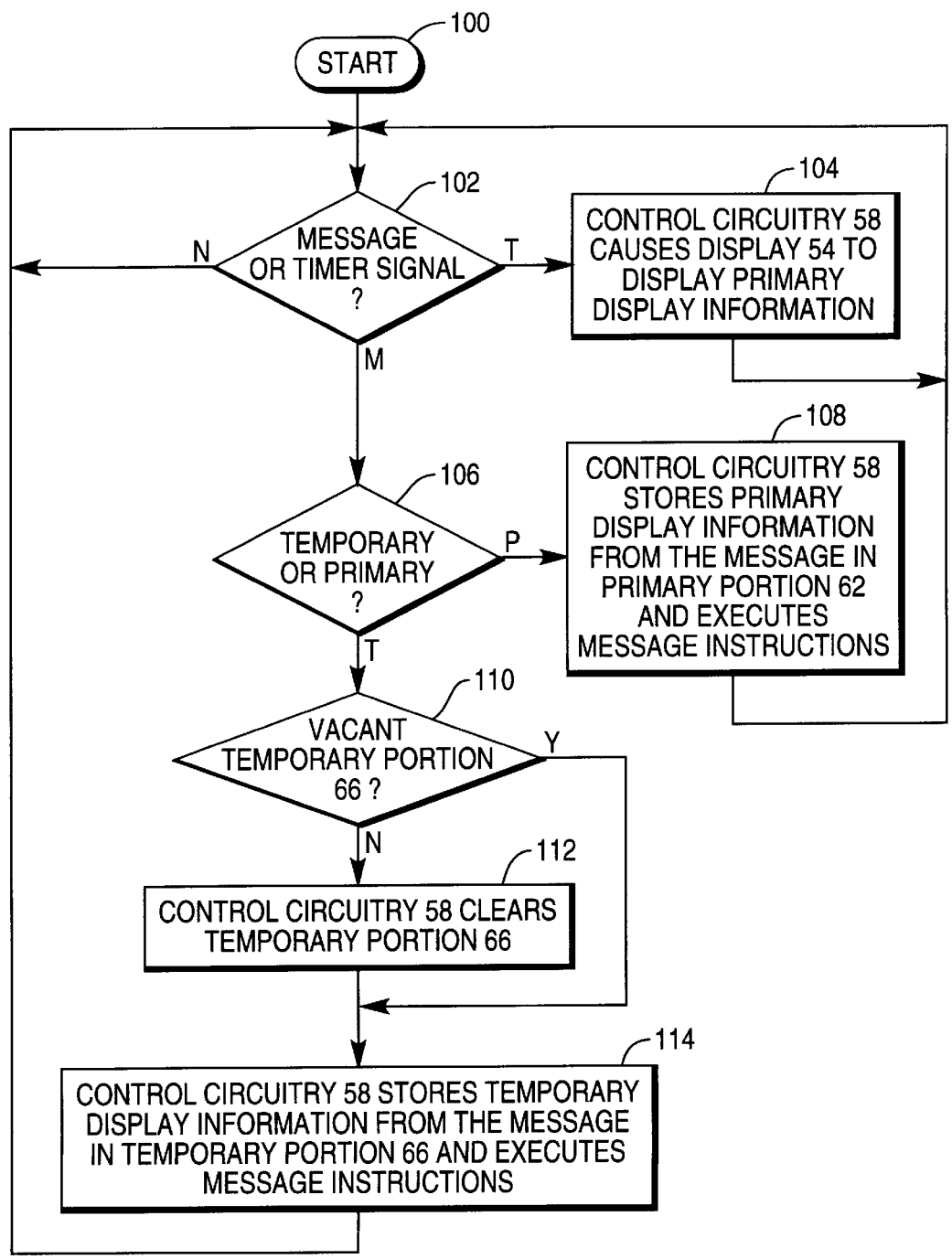

METHOD OF DISPLAYING TEMPORARY INFORMATION BY AN ELECTRONIC PRICE LABEL

CROSS-REFERENCE TO RELATED APPLICATIONS

The present invention is related to the following commonly assigned and co-pending U.S. application:

"Method of Displaying Information By An Electronic Price Label", filed Dec. 4, 1998, invented by Goodwin, and having a U.S. Pat. No. 6,047,263.

BACKGROUND OF THE INVENTION

The present invention relates to electronic price label (EPT,) systems, and more specifically to a method of displaying temporary information by an EPL.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs typically include a memory for storing operating information, display information, and instructions. This memory typically includes a plurality of data registers. A typical EPL with an eight-character liquid crystal display requires one data register for storing display information. This information may include price information and promotional information.

In order to temporarily change information displayed by an EPL, a message containing the temporary information must be sent to the EPL. Following expiration of the temporary period, a message containing the originally displayed information must be sent to the EPL. In total, two messages containing the originally displayed information must be sent to the EPL, one before the temporary change and one after the temporary change.

Therefore, in order to conserve EPL system's communication bandwidth and change display states faster, it would be desirable to provide a method of displaying temporary information by an EPL which avoids having to send originally displayed information back to an EPL after displaying the temporary information.

SUMMARY OF THE INVENTION

In accordance with the teachings of the present invention, a method of displaying temporary information by an EPL is provided.

The method includes the steps of receiving a message containing second information by the EPL, ceasing display of first information by the EPL, displaying the second information by the EPL, reading the first information from a memory within the EPL by the EPL, and redisplaying the first information by the EPL.

It is a feature of the present invention that the first display information is only sent a single time to the EPL. The EPL stores the first information in its memory and obtains the first information from the memory in order to redisplay it.

It is accordingly an object of the present invention to provide a method of displaying temporary information by an EPL.

It is another object of the present invention to provide a method of displaying temporary information by an EPL which avoids having to send originally displayed information back to an EPL, after displaying the temporary information.

It is another object of the present invention to provide a method of displaying temporary information by an EPL which stores both primary and temporary information in the EPL.

It is another object of the present invention to conserve EPL system communication bandwidth.

It is another object of the present invention to return to a previous display state as quickly as possible.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2B is a block diagram of second embodiment of an EPL;

FIG. 3B is a flow diagram illustrating a second embodiment of the method of the present invention.

DETAILED DESCRIPTION OF THE PREFERRED EMBODIMENT

Figure 1:
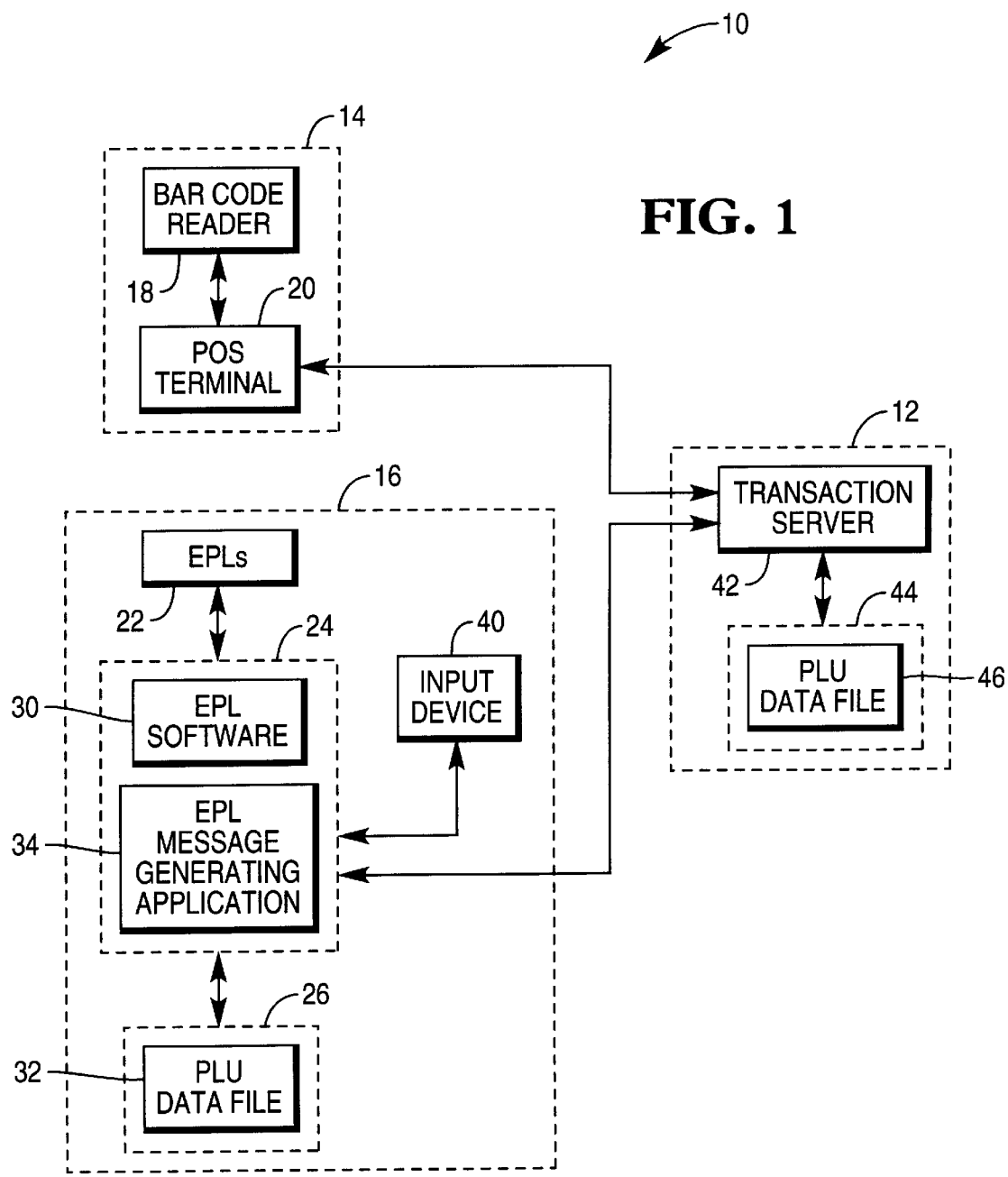
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and POS terminal 20.

EPL system 16 primarily includes EPLs 22, host EPL computer 24, and EPL storage medium 26.

Host EPL computer 24 executes EPL software 30. To assist with execution of certain tasks performed by EPL software 30, EPL computer 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 46 as they are entered in input device 40 (immediate processing) or after they have been stored within price look-up (PLU) data file 46.

EPL computer 24 also executes EPL message generating application 34. EPL message generating application 34 records operator-entered display information and instructions and allows the operator to create messages to EPLs 22.

EPL message generating application 34 passes messages to EPL software 30 for scheduling and transmission.

EPL message generating application 34 may be any application which is designed to send and receive messages from EPLs 22.

EPL storage medium 26 stores EPL data file 32. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2A:
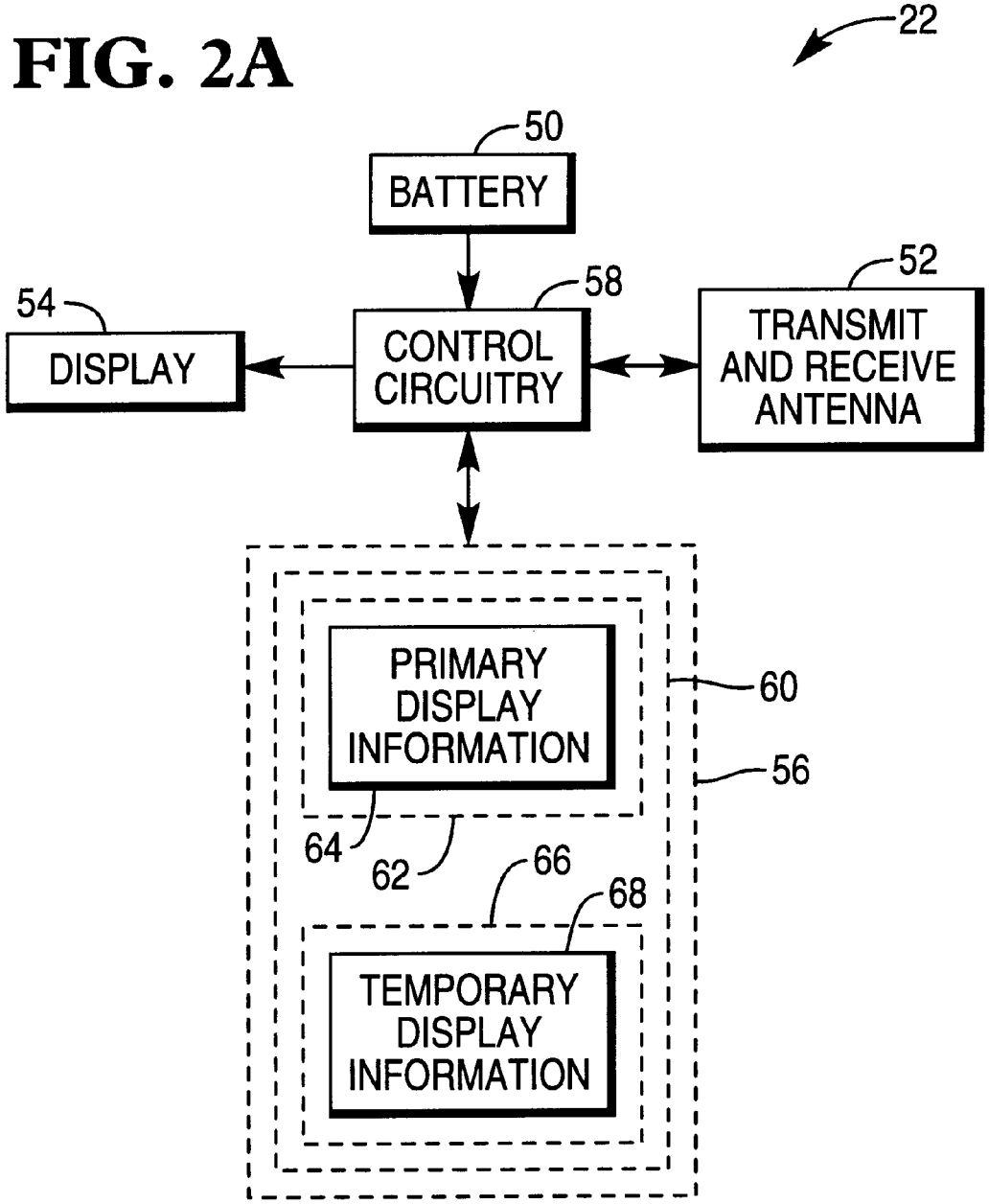
FIG. 2A is a block diagram of first embodiment of an EPL.

Turning now to FIGS. 2A–2B, EPLs 22 each include battery 50, transmit and receive antenna 52, display 54, memory 56, and control circuitry 58.

Battery 50 provides power to each EPL 22.

Transmit and receive antenna 52 receives and transmits messages to EPL computer 24.

Display 54 displays price and possibly additional information, such as promotional information. Display 54 is preferably a liquid crystal display (LCD).

Memory 56 includes a plurality of data registers 60. Under the present invention, a first portion 62 of memory 56 stores primary display information 64, and a second portion 66 of memory 56 stores temporary display information 68. Thus, at least one group of data registers 60 stores temporary display information 68 and the one group includes at least one data register 60.

For example, in an EPL 22 having four data registers, one data register may be added to store temporary display information 68.

As another example, in an EPL 22 having eight data registers, four data registers may be allocated to store temporary display information 68. The four data registers may be further divided to store first, second, third, and fourth temporary display information 68.

EPL circuitry 58 controls the internal operation of EPLs 22 and includes transceiver circuitry for communicating with EPL computer 24.

In particular, EPL circuitry 58 executes instructions from EPL computer 24 which designate information to be displayed. For example, one such instruction is an instruction to display the temporary display information.

FIG. 2B differs from FIG. 2A in that EPL 22 additionally includes timer circuits 76 which signal control circuitry 58 to stop displaying temporary information 68 and return to displaying primary information 64. Thus, for example, if one data register contains temporary display information 68, a timer circuit associated with that data register signals control circuitry 58 to stop displaying temporary information 68 and return to displaying the primary information 64.

The embodiment of FIG. 2A requires a message from EPL computer 24 to signal control circuitry 58 to stop displaying temporary display information 68 and to redisplay the primary information 64.

During normal operation, control circuitry 58 receives messages from EPL computer 24, determines whether the display information in the messages is new primary display information or new temporary display information. Control circuitry 58 examines the message for a flag, command code, or other indication of primary or temporary status. If the display information is new temporary display information, control circuitry 58 determines whether a vacant temporary display group exists. If one does exist, control circuitry 58 stores the new temporary display information in the vacant temporary display group and executes the associated display instructions. If one does not exist, control circuitry 58 determines a temporary display group containing executed display information, replaces the executed display information with the new temporary display information, and executes the associated display instructions for the new temporary display information.

In the first embodiment, control circuitry 58 causes display 54 to display the new temporary display information until it receives a cancel message from EPL computer 24. In response to the cancel message, control circuitry 58 causes display 54 to display the primary display information that display 54 was displaying before displaying the new temporary display information.

In the second embodiment, control circuitry 58 causes display 54 to display the new temporary display information and initializes the associated time circuit based upon instructions in the message. Control circuitry 58 causes display 54 to stop displaying the new temporary display information when it receives a timer signal from the associated timer circuit. In response to the timer signal, control circuitry 58 causes display 54 to display the primary display information display 54 was displaying before displaying the new temporary display information.

For example, suppose a retailer enters a new item into system 10 and the retailer wishes to display "new item" as primary display information 64 on the EPL 22 assigned to the new item. Later that week, the retailer puts the new item on a one-day special promotion to boost customer awareness. In this case, temporary display information 68 could be "on sale/save 0.40". After the one-day special promotion has expired, the EPL 22 easily reverts back to displaying primary display information 64, "new item".

Another example relates to Plan-o-gram compliance. Suppose that after store hours a stocker needs to know how to stock shelves. Primary display information 64 is price information. Temporary display information 68, such as "01.04|3.4" for a product, may be sent to an EPL 22 assigned to the product. This means that the product is in section 1, shelf 4, position 3 and has a facing value of 4 (4 wide). After the stocker has read temporary display information 68 and stocked the shelf, a cancel message or timer signal causes primary display information 64 to be displayed.

Figure 3A:
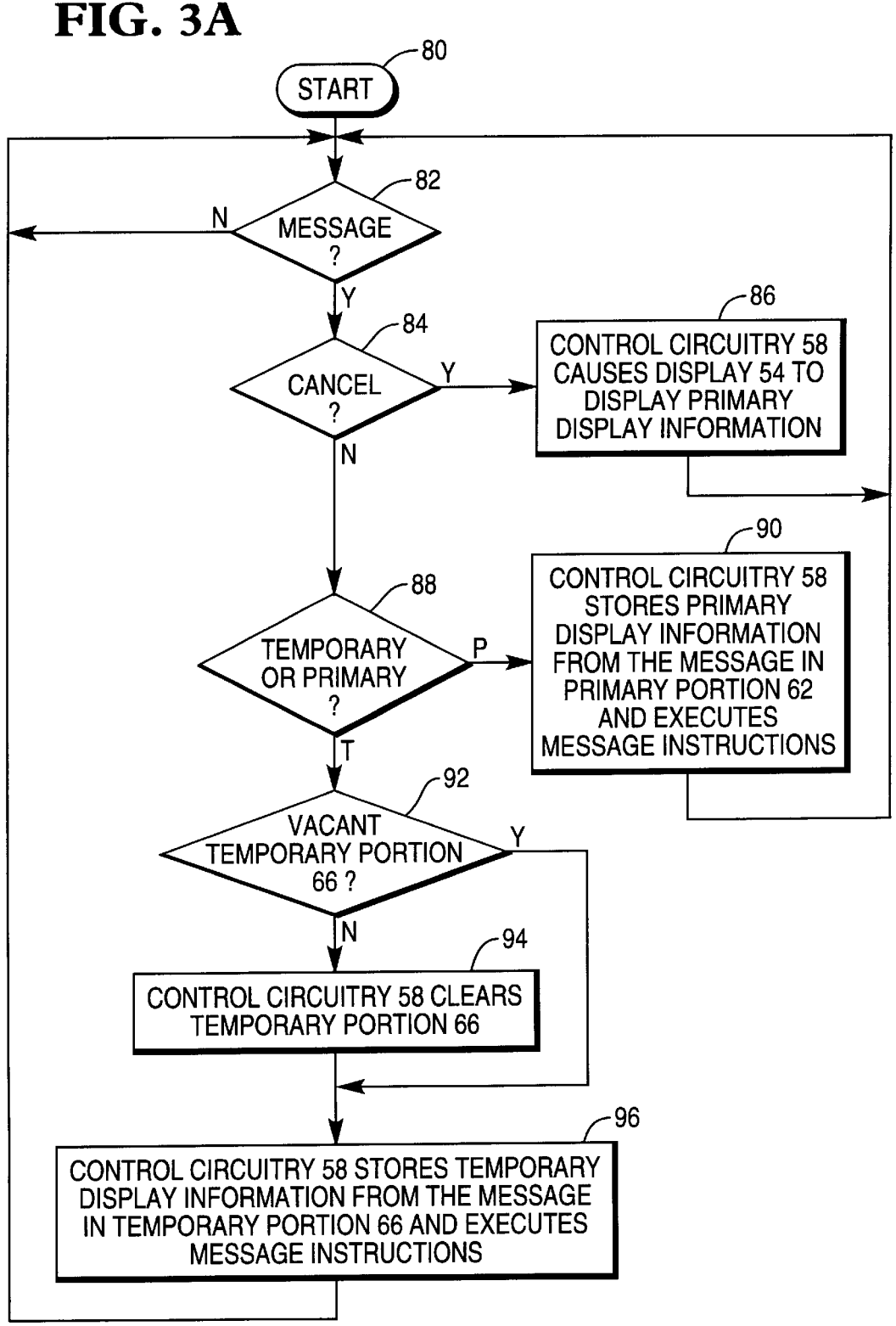
FIG. 3A is a flow diagram illustrating a first embodiment of the method of the present invention.

Turning now to FIG. 3A, a temporary display method corresponding to the first embodiment (FIG. 2A) is illustrated in more detail beginning with START 80.

In step 82, control circuitry 58 waits for a message from FPL computer 24. If control circuitry 58 receives a message, operation proceeds to step 84.

In step 84, control circuitry 58 determines if the message contains a cancel instruction. If it does, operation proceeds to step 86. Otherwise, operation continues to step 88.

In step 86, control circuitry 58 causes display 54 to display primary display information 64 from primary portion 62 instead of temporary display information 68. Operation returns to step 82 to wait for another message.

In step 88, control circuitry 58 determines whether the message contains temporary display information 68 or primary display information 64. If it contains primary display information 64, operation proceeds to step 90. Otherwise, operation continues to step 92.

In step 90, control circuitry 58 stores primary display information 64 from the message in primary portion 62 and causes display 54 to execute the instructions in the message, which include causing display 54 to display primary display information 64 in the message. Operation returns to step 82 to wait for another message.

In step 92, control circuitry 58 determines whether temporary portion 66 has room to store temporary display information 68. For example, if temporary portion 66 includes more than one group, control circuitry 58 looks for a vacant group. As another example, if temporary portion 66 includes a single data register 60, control circuitry 58 determines whether it is vacant. If so, operation proceeds to step 96. Otherwise, operation continues at step 94.

In step 94, control circuitry 58 clears temporary portion 66. If temporary portion 66 includes more than one group, control circuitry 58 clears one of the groups. If temporary portion 66 includes a single data register 60, control circuitry 58 determines clears that data register.

In step 96, control circuitry 58 stores temporary display information 68 from the message in temporary portion 66 and causes display 54 to execute the instructions in the message, which include causing display 54 to display temporary display information 68 in the message. Operation returns to step 82 to wait for another message.

Since only a single message is needed to convey display information to EPL 22 instead of two messages, this method saves bandwidth and quickens display changes.

Turning now to FIG. 3B, a temporary display method corresponding to the second embodiment (FIG. 2B) is illustrated in more detail beginning with START 100.

In step 102, control circuitry 58 waits for a message from EPL computer 24 or a timer signal from a timer circuit (FIG. 3B). If control circuitry 58 receives a message, operation proceeds to step 106. If control circuitry 58 receives a timer signal, operation proceeds to step 104.

In step 104, control circuitry 58 causes display 54 to display primary display information 64 from primary portion 62 instead of temporary display information 68. Operation returns to step 102 to wait for another message or timer signal.

In step 106, control circuitry 58 determines whether the message contains temporary display information 68 or primary display information 64. If it contains primary display information 64, operation proceeds to step 108. Otherwise, operation continues to step 110.

In step 108, control circuitry 58 stores primary display information 64 from the message in primary portion 62 and causes display 54 to execute the instructions in the message, which includes causing display 54 to display primary display information 64 in the message. Operation returns to step 102 to wait for another message.

In step 110, control circuitry 58 determines whether temporary portion 66 has room to store temporary display information 68. if so, operation proceeds to step 114. Otherwise, operation continues at step 112.

In step 112, control circuitry 58 clears temporary portion 66.

In step 114, control circuitry 58 stores temporary display information 68 from the message in temporary portion 66 and causes display 54 to execute the instructions in the message, which includes causing display 54 to display temporary display information 68 in the message and initializing timer circuit 76 with time information contained in the instructions. Timing information is preferably included in the message containing temporary display information 68, but may also be send in a separate message when time and/or bandwidth are not critical. Operation returns to step 102 to wait for another message.

Since only a single message is needed to convey display information to EPL 22 instead of two messages, this method saves bandwidth and quickens display changes. This method saves additional bandwidth and time because a cancel signal is not required.

Although the present invention has been described with particular reference to certain preferred embodiments thereof, variations and modifications of the present invention can be effected within the spirit and scope of the following claims. For example, EPL group management software 34 and EPL action software 38 may be a single application.

I claim:

1. A method of displaying second information followed by first information displayed previous to the second information by an electronic price label (EPL) comprising the steps of:

(a) receiving a message containing the second information by the EPL;

(b) ceasing display of the first information by the EPL but retaining the first information in a memory within the EPL;

(c) displaying the second information by the EPL;

(e) reading the first information from the memory by the EPL; and (f) redisplaying the first information by the EPL.

2. The method as recited in claim 1, further comprising the steps of:

(g) initializing a timer circuit in the EPL by the EPL following step (c); and (h) receiving a signal from the timer circuit following expiration of a predetermined time period of displaying the second information by the EPL prior to step e.

3. The method as recited in claim 1, further comprising the step of:

(g) receiving a message containing a command to cancel display of the second information and redisplay the first information by the EPL prior to step e.

4. A method of displaying first information followed by second information followed by the first information by an electronic price label (EPL) comprising the steps of:

(a) receiving a first message including the first information by the EPL, wherein the first information is received by the EPL. only once;

(b) storing the first information in a memory within the EPL by the EPL;

(c) displaying the first information by the EPL;

(d) receiving a second message containing the second information by the EPL;

(e) displaying the second information by the EPL;

(f) receiving a command to redisplay the first information by the EPL;

(g) reading the first information from the memory by the EPL; and (h) redisplaying the first information by the EPL.

5. The method as recited in claim 4, wherein step f comprises the substep of:

(f-1) receiving a third message containing a command to cancel display of the second information and redisplay the first information by the EPL.

6. A method of displaying information by an electronic price label (EPL) comprising the steps of:

(a) receiving a first message containing primary display information by the EPL, wherein the primary display information is received by the EPL only once;

(b) storing the primary display information in a memory within the EPL by the EPL;

(c) displaying the primary display information by the EPL;

(d) receiving a second message containing temporary display information by the EPL;

(e) displaying the temporary display information by the EPL;

(f) receiving a command to redisplay the primary display information by the EPL;

(g) reading the primary display information from the memory by the EPL; and (h) redisplaying the primary display information by the EPL.

7. An electronic price label (EPL) comprising:

a display;

a memory containing a first portion for storing first information and a second portion for storing second information; and a control circuit which receives a first message containing the first information and a second message subsequent to the first message containing the second information, which stores the first information in the first portion and the second information in the second portion, which causes the display to display the first information following receipt of the first message and the second information following receipt of the second message, and which reads the first information from the first portion and causes the display to redisplay the first information following receipt of an indication to redisplay the first information subsequent to the second message.

8. The EPL as recited in claim 7, further comprising:

a timer circuit controlled by the control circuit which provides the indication;

wherein the control circuit initializes the timer circuit with a predetermined time period for displaying the second information.

9. The EPL as recited in claim 7, wherein the control circuit receives a third message containing the indication.

10. An electronic price label (FPL) system comprising:

a computer which sends first and second messages containing first and second information; and an EPL, including a display;

a memory containing a first portion for storing the first information from the computer and a second portion for storing the second information from the computer; and a control circuit which receives the first message and the second message subsequent to the first message, which stores the first information in the first portion and the second information in the second portion, which causes the display to display the first information following receipt of the first message and the second information following receipt of the second message, and which reads the first information from the first portion and causes the display to redisplay the first information following display of the second information.

11. A method of displaying first information followed by second information followed by the first information by an electronic price label (EPL) comprising the steps of:

(a) receiving a first message including the first information by the EPL, wherein the first information is received by the EPL only once;

(b) storing the first information in a memory within the EPL by the EPL;

(c) displaying the first information by the EPL;

(d) receiving a second message containing the second information by the EPL;

(e) displaying the second information by the EPL;

(f) receiving a third message containing a command to cancel display of the second information and redisplay the first information by the EPL;

(g) reading the first information from the memory by the EPL; and (h) redisplaying the first information by the EPL.

12. An electronic price label (EPL) comprising:

a display;

a memory containing a first portion for storing first information and a second portion for storing second information; and a control circuit which receives a first message containing the first information and a second message subsequent to the first message containing the second information, which stores the first information in the first portion and the second information in the second portion, which causes the display to display the first information following receipt of the first message and the second information following receipt of the second message, and which reads the first information from the first portion and causes the display to redisplay the first information following receipt of a third message containing an indication to redisplay the first information subsequent to the second message.

* * * * *